3,780,110
METHOD FOR PREPARING 3-FLUORO-
SALICYLALDEHYDE
Walter A. Gay, Cheshire, and Maurice A. Raymond, Northford, Conn., assignors to Olin Corporation, New Haven, Conn.
No Drawing. Filed Feb. 7, 1972, Ser. No. 224,276
Int. Cl. C07c 45/00
U.S. Cl. 260—600
9 Claims

ABSTRACT OF THE DISCLOSURE

An integrated method for preparing 3-fluorosalicylaldehyde by reacting ortho-fluorophenol with a boron-containing compound and a formaldehyde source material.

---

The invention herein described was made in the course of or under a contract or subcontract thereunder with the Air Force.

This invention relates to the preparation of 3-fluorosalicylaldehyde by a simplified integrated method in which ortho-fluorophenol is reacted with a boron-containing compound and a formaldehyde source material.

Several methods are known for the preparation of 3-fluorosalicylaldehyde, however, such methods often result in low yields or involve techniques which are costly, thus making them economically unattractive. The Reimer-Tiemann reaction involves the reaction of ortho-fluorophenol with chloroform and sodium hydroxide. (See L. N. Ferguson et al., Journal of the American Chemical Society, 68, 2502, 1946 and U.S. Pat. 2,493,654.) While this method is one of the simplest, it has the disadvantage of a low conversion and a high para-isomer contamination.

The Kolbe-Schmidt reaction involves carboxylating an alkali salt of ortho-fluorophenol with carbon dioxide under high pressure to give both the ortho and para-isomers of the acid. Reduction of the mixed acids with sodium amalgam followed by hydrolysis and distillation gives the desired 3-fluorosalicylaldehyde. The disadvantages of this method is the necessity for using costly high pressure equipment and also the need to recover mercury from the latter step (See Ferguson et al. and '654 patent noted above).

Another method for preparing 3-fluorosalicylaldehyde involves a complex seven-step process wherein 2-amino-4-chloroanisole is converted to the desired product. This route besides involving a multiplicity of process steps, gives a low yield and also involves the use of the Schiemann reaction to introduce fluorine; a procedure which is hazardous even on a laboratory scale (see U.S. Pats. 2,576,064, 2,576,065, 2,590,813, and 2,676,189).

Marchand et al., U.S. Pat. 3,290,393 disclose a method for the preparation of salicyl alcohols by reaction of selected phenols with boron oxide and trioxane. Marchand et al. in U.S. Pat. 3,321,526 further disclose the preparation of salicylaldehyde by oxidizing the salicyl alcohol with oxygen using a palladium catalyst. This technique has the disadvantage of requiring an expensive catalyst.

Now in accordance with the process of this invention, it has surprisingly and unexpectedly been found that 3-fluorosalicylaldehyde can be prepared in an integrated process in high yield. More particularly, this invention involves the reaction of ortho-fluorophenol with a selected boron-containing compound and a selected formaldehyde source material to produce 3-fluorosalicylaldehyde as shown by the following equation wherein boron oxide and trioxane are used as reactants:

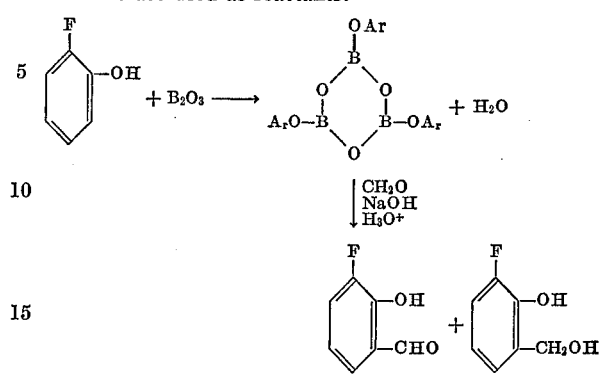

where Ar is —$C_6H_4F$. The 3-fluorosalicyl alcohol, which is produced by the above-noted reaction, can be readily oxidized to 3-fluorosalicylaldehyde by known oxidation techniques and also by the method as disclosed in the co-pending application by Walter A. Gay and Maurice A. Raymond entitled, "Method for Preparing Aromatic Aldehydes," application Ser. No. 224,272.

The key point in this invention is the recognition that certain process conditions must be carefully controlled in order to obtain the desired product in significant yields. This is particularly true because of the nature of the starting material ortho-fluorophenol. Generally, the presence of the fluorine substituent, which blocks one of the ortho positions, results in a lower yield. Additionally, the fluorine substituent has significant effects on the meta position (ortho to the phenolic hydroxy) and the para position. The result of such effects is deleterious to product formation and undesirably increases the amount of resin formation.

The problems noted above are overcome to a large extent when the following conditions are satisfied. First, the concentration level of unreacted formaldehyde must be kept fairly low in order to avoid undesired resin formation. The temperature of the reaction with formaldehyde must be maintained above a particular level in order to increase the rate of selective ortho reaction and to decrease resin formation. More particularly, this temperature should be maintained at a minimum of about 90° C. Additionally, the pH of the final reaction mixture after the hydrolysis-acidification steps must be controlled to minimize resin formation.

Ortho-fluorophenol is generally used as the starting material, however, other innocuous substituents may be included on the ring in positions other than the available ortho position, if desired. Generally substituents such as alkyl, aryl, alkoxy and halogen may be included on the ortho-fluorophenol ring. Reference in the specification and the claims to the term "ortho-fluorophenol" is intended to include unsubstituted ortho-fluorophenol as well as any substituted ortho-fluorophenols of the type noted above. Also, reference to the term "3-fluorosalicylaldehyde" in the specification and claims is intended to include substituted and unsubstituted 3-fluorosalicylaldehydes.

A wide variety of compounds may be utilized as the boron-containing compounds in the method of this invention. More particularly, boron compounds which are suitable for use as starting materials include boron oxide, orthoboric acid, metaboric acid, tetraboric acid and the respective anhydrides. Boron oxide, orthoboric acid and metaboric acid are preferred because of their relatively low cost.

During the reaction of ortho-fluorophenol with the boron-containing compound, a non-reactive azeotrope forming solvent may be used. Xylene, toluene, benzene, ethyl benzene, mesitylene are among the useful solvents but other inert solvents may also be used with the only consideration being that the azeotropic distillation temperature should be high enough to effect an efficient rate of reaction. Further illustrations of useful solvents of this type may be found in "Organic Solvents" edited by Weissburger et al., vol. VII, 2nd edition, 1955.

Generally, a number of formaldehyde or formaldehyde producing substances may be utilized in the methylolation-carbonylation step. More particularly, useful formaldehyde source materials include formaldehyde gas, paraformaldehyde and trioxane.

Following reaction with formaldehyde, the desired product is recovered from the reaction mixture by saponification with base followed by acidification. Generally a wide variety of basic materials may be utilized for the first part noted above and more particularly any Bronsted base such as the alkali metal hydroxides and carbonates may be used. Acidification may be effected with a wide variety of acids and more particularly any Bronsted acid such as sulfuric and acetic acid may be used.

The amount of boron-containing compound utilized in the process of this invention generally will vary from about 0.1 to about 10 and preferably from about 0.25 to about 2.5 moles of boron-containing compound per mole of ortho-fluorophenol. Most preferred is a stoichiometric amount or slight excess of the boron-containing compound.

The amount of formaldehyde source material may vary widely and generally the amount used will depend on the amount of formaldehyde which is desired to be generated. More particularly, from about 0.1 to about 10 and preferably from about 0.3 to about 3.0 moles of generated formaldehyde per mole of ortho-fluorophenol may be used. Most preferred is a stoichiometric amount of said formaldehyde material.

The amount of base used in the saponification step is not critical and any amount sufficient to separate the boron and phenolic products may be used. More particularly from about 0.5 to about 5 and preferably from about 1 to about 3 moles of base per mole of ortho-fluorophenol may be used.

The amount of acid used in the acidification step will depend on the desired pH. Generally a pH of from about 1 to about 7 may be utilized, however to minimize resin formation, a pH of from about 3 to about 5 is preferred.

The reaction temperature during the step when the boron compound is being reacted can be varied depending on the particular solvent and reactants but desirably will be maintained at the azeotropic distillation temperature. More particularly a temperature of from about 50 to about 300° C. can be used for this step.

The temperature of the methylolation-carbonylation step will be dependent upon the source of formaldehyde with the main emphasis being to obtain a high enough temperature to effect depolymerization. More significantly, the temperature must be maintained at a certain level to increase the rate of selective ortho reaction and to decrease resin formation. More particularly, the temperature during the formaldehyde reaction step may be from about 90 to about 500° C. and preferably from about 110 to about 150° C.

The reaction may be run at atmospheric pressure but pressures from atmospheric (0 p.s.i.g.) up to about 2000 p.s.i.g. may be used if desired.

It is important that the concentration level of unreacted formaldehyde be kept fairly low in order to avoid undesired resin formation. In order to maintain desired concentration levels, the addition time of formaldehyde material will vary from at least about 1 hour to about 24 or more hours and preferably from about 2 to about 6 hours. Subsequent heating time after the addition of formaldehyde is not critical and may vary from 0 to about 24 hours and preferably from about 4 to about 16 hours.

Isolation of the final product after acidification may be effected by steam distillation or by extraction techniques.

The following examples further illustrate the process of this invention.

EXAMPLE I

A reaction mixture consisting of 112 g. (1.0 mole) o-fluorophenol, 35 g. (0.5 mole) ball-milled boron oxide and 200 ml. xylene was subjected to azeotropic distillation to remove 90 percent of the theoretical amount of water in 18 hours under a nitrogen atmosphere. The temperature was lowered to 115° C. and a solution of 30.2 g. (0.33 mole) s-trioxane in 200 ml. xylene was added dropwise to the rapidly stirred solution over a period of five hours, maintaining the temperature at 115° C. The reaction mixture was stirred at 115° C. for 18 hours, cooled to 10° C. and one liter of 2.5 N sodium hydroxide was added at such a rate as to maintain the temperature below 15° C. (approximately one hour) with ice bath cooling. The cold, two-phase system was suction filtered giving 12.2 g. tan solid. The phases were separated, and the lower, aqueous phase was acidified to a pH of 4.1 with approximately 475 ml. of 37 percent hydrochloric acid, while keeping the temperature below 15° C. with ice bath cooling. The resulting solution was extracted with three 400 ml. portions of ether, the final extraction being performed after the aqueous phase was salted. The ether extracts were combined and dried over magnesium sulfate, filtered and the bulk of the ether removed by distillation through a 15-inch Vigreux column to give 134.7 g. of concentrate. This was further concentrated on a rotary film evaporator to give 78.2 g. amber oil and 28.7 g. of distillate. VPC (vapor phase chromatographic) analysis of the amber oil showed it to contain 21.0 g. of 3-fluorosalicylaldehyde corresponding to a yield of 15.0 percent. Additionally 47.8 g. of 3-fluorosalicyl alcohol was present. VPC analysis of the distillate showed it to contain 21.8 g. of o-fluorophenol representing a conversion of 78 percent. Total corrected yield of 3-fluorosalicylaldehyde was 19.0 percent.

EXAMPLE II

A three-neck, one liter Morton flask equipped with blade stirrer, thermometer and Dean-Stark azeotropic distillation trap was charged with 112 g. (1.0 mole) o-fluorophenol, 35 g. (0.5 mole) ball-milled, finely divided boron oxide and 200 ml. of xylene. This was heated and rapidly stirred at 140–145° C. for 23 hours under nitrogen after which time 8.6 g. of water were collected in the trap. This represented 96 percent of the theoretical amount. At this point the mixture was cooled to 120° C. and a solution of 30.2 g. (0.33 mole) s-trioxane in 200 cc. xylene was added dropwise over a period of 3.5 hours. The reaction mixture was stirred an additional 16 hours at 115° C. Work-up as in Example I gave an 84% conversion of o-fluorophenol and a corrected yield of 3-fluorosalicylaldehyde of 24.8 percent.

What is claimed is:

1. A method for the preparation of 3-fluorosalicylaldehyde comprising:
   (a) reacting ortho-fluorophenol with a boron-containing compound selected from the group consisting of boron oxide, orthoboric acid, metaboric acid, tetraboric acid and the respective anhydrides of said acids in the presence of a non-reactive azeotrope forming solvent and removing water by distillation at the azeotrope distillation temperature
   (b) adding a formaldehyde source material selected from the group consisting of formaldehyde, paraformaldehyde and trioxane to the reaction mixture over a period of from about 1 to about 24 hours and maintaining a reaction temperature of from about 90 to about 500° C.

(c) saponifying the resulting reaction mixture with a base and
(d) acidifying the resulting mixture with acid to a pH of from about 1 to 7.

2. The method of claim 1 wherein said formaldehyde source material is added over a period of from about 2 to about 6 hours.

3. The method of claim 1 wherein the temperature of the reaction with formaldehyde is maintained at from about 110 to about 150° C.

4. The method of claim 1 wherein the pH during said acidification step is maintained at from about 3 to about 5.

5. The method of claim 2 wherein the temperature of the reaction with formaldehyde is maintained at from about 110 to about 150° C. and the pH during said acidification step is maintained at from about 3 to about 5.

6. The method of claim 5 wherein from about 0.1 to about 10 moles of said boron-containing compound per mole of said ortho-fluorophenol is used and from about 0.1 to about 10 moles of generated formaldehyde per mole of said orthofluorophenol is used.

7. The method of claim 6 wherein from about 0.25 to about 2.5 moles of boron-containing compound per mole of ortho-fluorophenol is used and from about 0.3 to about 3.0 moles of generated formaldehyde per mole of ortho-fluorophenol is used.

8. The method of claim 7 wherein boron oxide is used as the boron-containing compound and trioxane is used as the formaldehyde source material.

9. The method of claim 8 wherein said azeotrope forming solvent is xylene.

References Cited
UNITED STATES PATENTS 3,290,393    12/1966    Marchand et al. _____ 260—600

BERNARD HELFIN, Primary Examiner

U.S. Cl. X.R.

260—623 R